(12) United States Patent
Chen et al.

(10) Patent No.: US 7,932,968 B2
(45) Date of Patent: *Apr. 26, 2011

(54) LIGHT DIFFUSION MODULE AND A BACK LIGHT MODULE USING THE SAME

(75) Inventors: Chung Chuan Chen, Nantou (TW); Kuang Ting Cheng, Tainan (TW); Kai-Ti Chen, Taipei (TW)

(73) Assignee: Au Optronics Corporation, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/549,692

(22) Filed: Aug. 28, 2009

(65) Prior Publication Data
US 2009/0316073 A1    Dec. 24, 2009

Related U.S. Application Data

(63) Continuation of application No. 11/533,846, filed on Sep. 21, 2006, now Pat. No. 7,602,459.

(51) Int. Cl.
*G02F 1/1335* (2006.01)
*F21V 7/04* (2006.01)

(52) U.S. Cl. ........... 349/64; 362/617; 362/620; 362/626

(58) Field of Classification Search .................. 428/142, 428/220; 349/64, 65; 345/64; 362/616, 362/617, 619, 620, 623, 625, 626
See application file for complete search history.

(56) References Cited

U.S. PATENT DOCUMENTS

| | | | |
|---|---|---|---|
| 5,280,371 A | 1/1994 | McCartney | |
| 5,600,462 A | 2/1997 | Suzuki | |
| 6,721,102 B2 | 4/2004 | Bourdelais | |
| 7,602,459 B2 * | 10/2009 | Chen et al. | 349/64 |
| 2005/0257363 A1 | 11/2005 | Li et al. | |
| 2006/0197888 A1 | 9/2006 | Huang | |

FOREIGN PATENT DOCUMENTS

| | | |
|---|---|---|
| EP | 1586920 | 10/2005 |
| JP | 5173134 | 7/1993 |

(Continued)

OTHER PUBLICATIONS

Taiwanese language office action dated Jun. 23, 2010.
English language translation of abstract and pertinent parts of JP 8036179 (published Feb. 6, 1996).
English language translation of abstract and pertinent parts of JP 2001-357978 (published Dec. 26, 2001).

(Continued)

*Primary Examiner* — John A Ward
(74) *Attorney, Agent, or Firm* — Thomas, Kayden, Horstemeyer & Risley, LLP

(57) ABSTRACT

A light diffusion module and a back light module using the same. The light diffusion module is disposed corresponding to the light source module of the back light module. The light diffusion module includes a first diffusion layer and the second diffusion layer. The first diffusion layer is disposed on top of the light source module and the top light exit surface has a plurality of first micro structures juxtapositioned to each other. The second diffusion layer is disposed on top of the first diffusion layer, and the top surface has a plurality of second micro structures juxtapositioned to each other. The ratio of the width of each first micro structure to the width of each second micro structure is between 1.1 and 1.8. The ratio of the height of each first micro structure to the height of each second micro structure is between 0.8 and 1.5.

37 Claims, 8 Drawing Sheets
(2 of 8 Drawing Sheet(s) Filed in Color)

FOREIGN PATENT DOCUMENTS

| | | |
|---|---|---|
| JP | 05-313004 | 11/1993 |
| JP | 8036179 | 2/1996 |
| JP | 2001-357978 | 12/2001 |
| JP | 2002-082623 | 3/2002 |
| TW | 200420978 | 10/2004 |
| TW | 200519466 | 6/2005 |
| TW | 200537054 | 11/2005 |

OTHER PUBLICATIONS

English language translation of abstract and pertinent parts of TW 200420978.

English language translation of abstract and pertinent parts of TW 200519466.

English language translation of abstract of TW 200537054.

* cited by examiner

LIGHT DIFFUSION MODULE AND A BACK LIGHT MODULE USING THE SAME

This application is a continuation of application Ser. No. 11/533,846, filed on Sep. 21, 2006 (now U.S. Pat. No. 7,602,459) which claims priority based on a Taiwanese patent application No. 095102200 filed on Jan. 20, 2006, both of which are incorporated herein by reference.

BACKGROUND OF THE INVENTION

1. Field of the Invention

The present invention relates generally to a light diffusion module and a back light module using the same; particularly, the present invention relates to a light diffusion module applied in the liquid crystal display panel and a back light module using the same.

2. Description of the Prior Art

The back light module has been widely applied to liquid crystal display device, computer keyboard, mobile phone key, billboard, and other devices which need light source to provide the plain light source. Particularly, the market demands for the liquid crystal display device raise rapidly in recent years, the design of the back light module applied to the liquid crystal display device becomes versatile in order to fulfill the requirement of function and appearance.

However, when the back light module is applied to the liquid crystal display panel, the uniformity of the light emitted from the back light module plays a very important role that influences the overall efficiency of the liquid crystal display panel all the time. Especially, while the size of the liquid crystal display panel grows larger day by day, disposing the lamps of the module vertically downward has become a trendy development of the current back light module. How to uniformly diffuse the light emitted from the lamps juxtapositioned to each other and further preventing the condition of excessively bright or excessively dark in certain areas become an important topic in designing the liquid crystal display panel.

FIG. 1a shows a conventional structure to diffuse the light. As FIG. 1a shows, the back light module 10 includes a plurality of lamps 13 juxtapositioned to each other and a reflecting plate 15. There is a light controlling board 31 on top of the lamp 13, which functions as leading and controlling the path of the light. The light controlling board 31 has a diffusion plate 32, which further diffuses the light. On top of the diffusion plate 32 is a liquid crystal glass 50. After running through the light diffusion simulation of the prior art structure, the light diffusion effect is shown in FIG. 1b. However as the area within the dotted line in FIG. 1b shows, it may be seen that those areas where lamps disposed tend to have the phenomenon of light concentration, and the darker parts of the weaker luminance area has the continuity as well.

SUMMARY OF THE INVENTION

It is an object of the present invention to provide a light diffusion module to harmonize the light emitting from the light diffusion module. It is another object of the present invention to provide a light diffusion module to supply enough luminance of the emitting light. It is a further object of the present invention to provide a back light module having more uniform light sourcing.

The present invention of the back light module includes a light source module and a light diffusion module. The light source module includes a light exit surface, wherein the light generated from the light source model 100 emits outwardly through the light exit surface. The light diffusion module is disposed corresponding to the light exit surface, includes a first diffusion layer and a second diffusion layer.

The first diffusion layer has a bottom light entrance surface and a top light exit surface. The bottom light entrance surface is disposed corresponding to the light exit surface of the light source module. The top light exit surface has a plurality of first micro structures juxtapositioned to each other. The first micro structure is preferred linear, having a triangular cross-sectional area. In addition, the first micro structure is preferred to be formed on the first diffusion layer by an optical film manufacturing process.

The second diffusion layer is disposed on top of the first diffusion layer, having a bottom surface and a top surface. The bottom surface is disposed corresponding to the top light exit surface of the first diffusion layer, and the top surface has a plurality of second micro structures juxtapositioned to each other. The second micro structure is preferred linear, having a triangular cross-sectional area. In addition, the second micro structure is preferred to be attached on the first diffusion layer.

The ratio of the width of each first micro structure to the width of each second micro structure is between 1.1 and 1.8. The ratio of the height of each first micro structure to the height of each second micro structure 420 is between 0.8 and 1.5. Under such a design ratio, the light diffusion module of the present invention may generate a better light diffusion effect and may have more uniform emitting light. Further, due to the enhancing effect of the first micro structure and the second micro structure, it may not cause too much luminance loss while the light passes through the first diffusion layer and the second diffusion layer.

In another embodiment, the light diffusion module further includes a third diffusion layer. The third diffusion layer is disposed between the first diffusion layer and the second diffusion layer and the Haze is preferred over 80%.

BRIEF DESCRIPTION OF THE DRAWINGS

The file of this patent contains at least one drawing executed in color. Copies of this patent with the color drawing(s) will be provided by the Patent and Trademark Office upon request and payment of the necessary fee.

FIG. 1b shows a simulation diagram of the light distribution while applying the structure of the embodiment shown in FIG. 1a;

DETAILED DESCRIPTION OF THE PREFERRED EMBODIMENT

The present invention provides a light diffusion module and a back light module using the same. In a preferred embodiment, the back light module is provided for the use of a liquid crystal display (LCD) panel. In another embodiment, however, the back light module may be also provided for the use of a PC keyboard, mobile phone keys, billboards and other devices which need plane light source. Furthermore, the present invention further includes a liquid crystal display panel using the light diffusion module. In the preferred embodiment, the liquid crystal display panel includes a color liquid crystal display panel. However in another embodiment, the liquid crystal display panel of the present invention includes a mono liquid crystal display panel. The liquid crystal display device broadly refers to any display device using the liquid crystal panel, which includes a home LCD TV, LCD monitor for PC and laptop, liquid crystal display panel of mobile phone and digital camera.

Figure 1A:
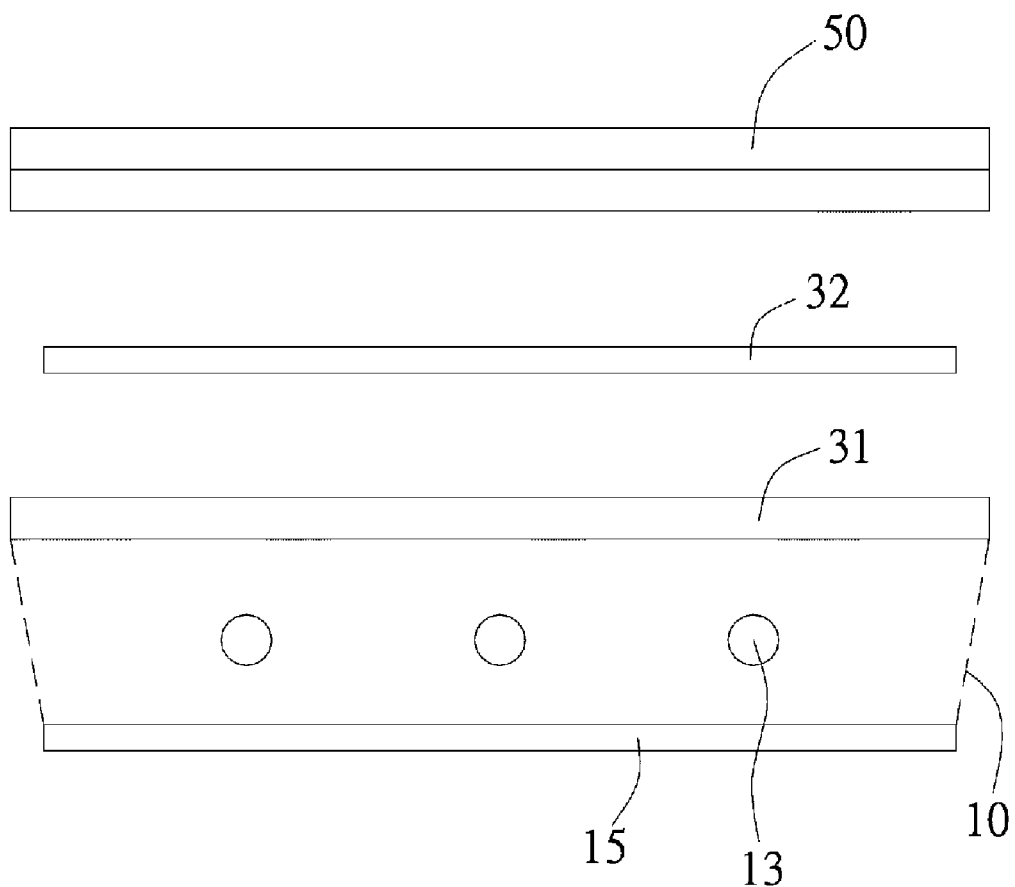
FIG. 1a shows a prior art of the liquid crystal display panel structure.
Figure 1B:
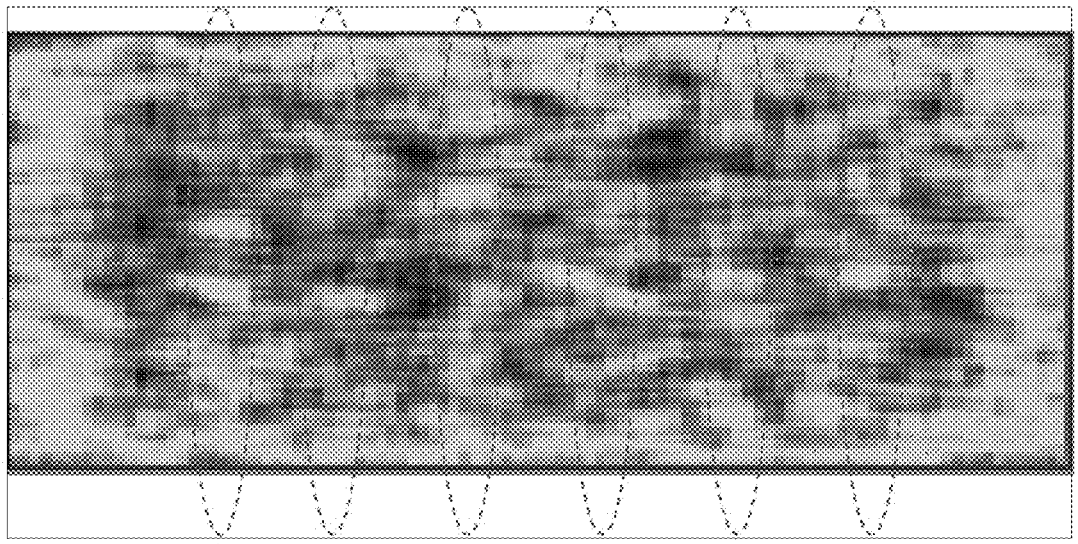
Figure 2:
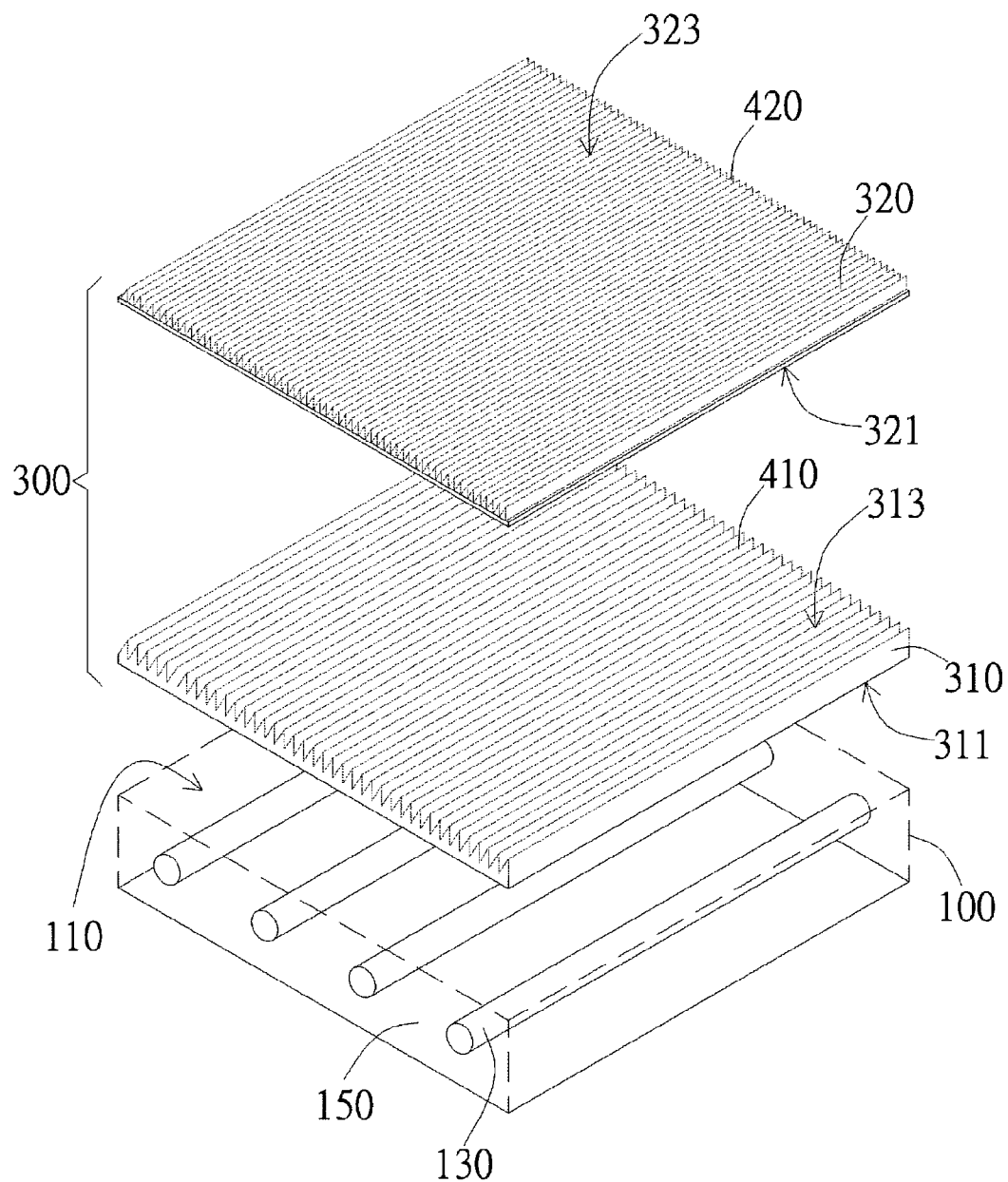
FIG. 2 is an explosive view of the embodiment of the back light module of present invention.

As FIG. 2 shows, the back light module of the present invention includes a light source module 100 and a light diffusion module 300. The light source module has a light exit surface 110, preferably with a lamp 130 and a reflecting plate 150. The light generated from the light source model 100 emits outwardly through the light exit surface 110. However in another embodiment, the light source module 100 may adopt light from other sources rather than the lamp 130, such as light emitting diode (LED).

Figure 3A:
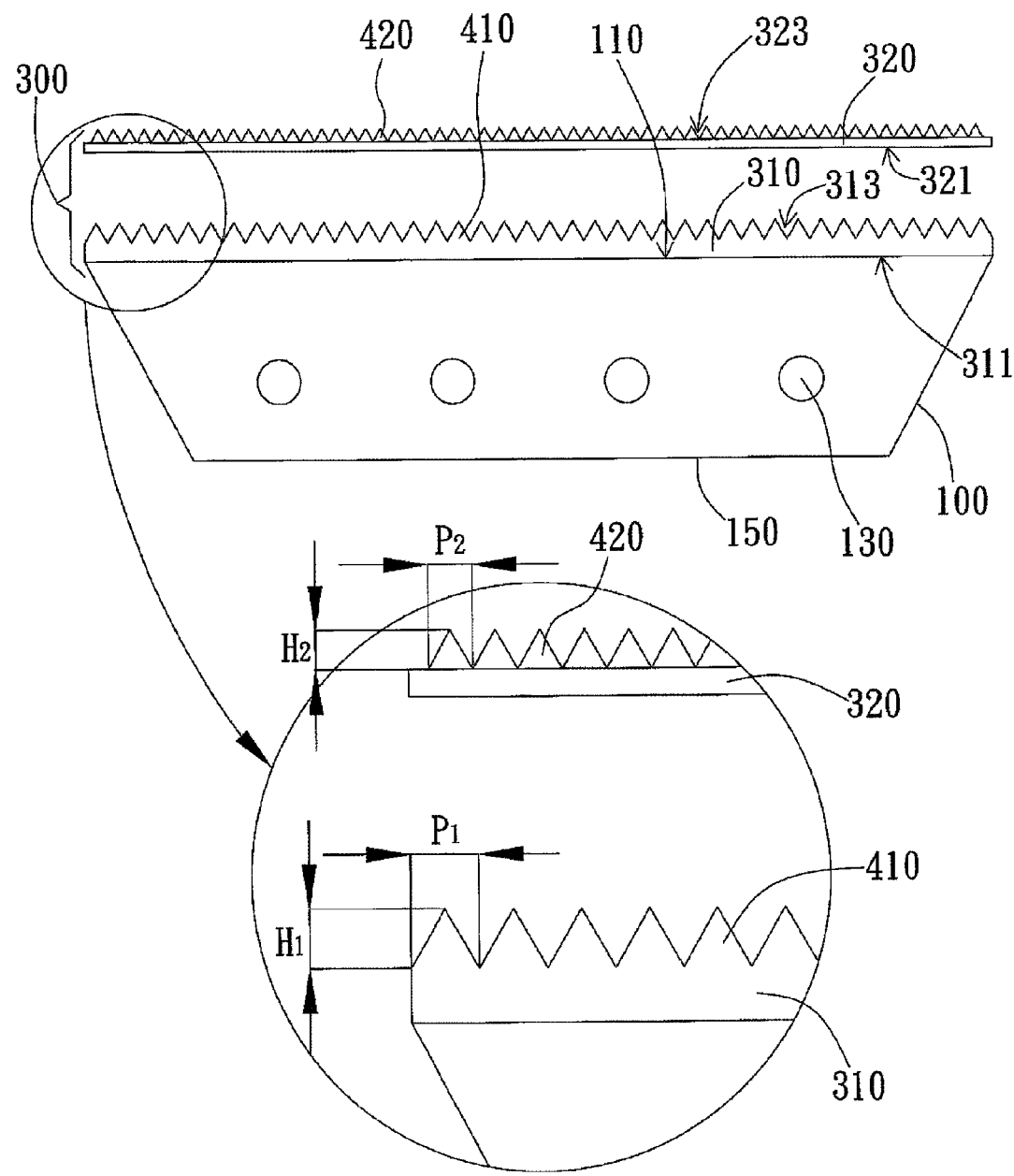
FIG. 3a is a sectional view of the embodiment shown in FIG. 2.

As FIG. 3a shows, the light diffusion module 300 is disposed corresponding to the light exit surface 110 and is preferred to be directly disposed on the light source module 100. The light diffusion module 300 mainly includes a first diffusion layer 310 and a second diffusion layer 320. In the preferred embodiment, the first diffusion layer 310 is made of Cyclo Olefin Polymer, (COP). However in another embodiment, the first diffusion layer 310 may be made of other organic materials, such as polyester, (PET) and polycarbonate, (PC), etc. In the preferred embodiment, the second diffusion layer 320 preferably includes an optical film and is made of polyester, (PET). However in another embodiment, the second diffusion layer may be made of other organic materials, such as polycarbonate, (PC).

The first diffusion layer 310 has a bottom light entrance surface 311 and a top light exit surface 313. The bottom light entrance surface 311 is disposed corresponding to the light exit surface 110 of the light source module 100. The top light exit surface 313 has a plurality of first micro structures 410 juxtapositioned to each other. As the embodiment shown in FIG. 2, the first micro structures 410 have a linear structure and are disposed in parallel with each other on the top light exit surface 313. However in another embodiment, the first micro structures 410 may have other different pattern as well. In addition, as FIG. 3a shows, the cross-sectional area of the first micro structures 410 is preferred to be triangular. However in another embodiment, the cross-sectional area of the first micro structures 410 may be semi-circular, polygonal or other kinds of shapes.

The first micro structure 410 is formed on the first diffusion layer 310 preferably by an optical film manufacturing process. The optical film manufacturing process mentioned here includes etching, photolithography, and deposition. However in another embodiment, the first micro structures 410 may be attached on the first diffusion layer 310 or by other approaches. In addition, the first micro structure 410 may be made of the material the same as the first diffusion layer 310. However in another embodiment, the first micro structure 410 may be made of other material, such as polymethy methacrylate, (PMMA), too.

As FIG. 3a shows, the second diffusion layer 320 is disposed on top of the first diffusion layer 310. The second diffusion layer 320 has a bottom surface 321 and a top surface 323, and the bottom surface 321 is disposed corresponding to the top light exit surface 313 of the first diffusion layer 310. The top surface 323 has a plurality of second micro structures 420 juxtapositioned to each other. As the embodiment shown in FIG. 2, the second micro structures 420 have a linear structure and are disposed in parallel with each other on the top light exit surface 323. However in another embodiment, the second micro structures 420 may have other different pattern as well. In addition, as FIG. 3a shows, the cross-sectional area of the second micro structures 420 is preferred to be triangular. However in another embodiment, the cross-sectional area of the second micro structures 420 may be semi-circular, polygonal or have other shapes.

As FIG. 2 shows, the first micro structure 410 and the second micro structure 420 are preferably disposed along the same direction, in other words, the first micro structure 410 and the second micro structure 420 extend along the same direction. In addition, the first micro structure 410 and the second micro structure 420 are preferably disposed in parallel with the direction of the lamp 130.

The second micro structure 420 is preferred to be attached on the first diffusion layer 310. However in another embodiment, the second micro structure 420 may be integrated on the second diffusion layer 320 by an optical film manufacturing process or by other approaches. The optical film manufacturing process mentioned here includes etching, photolithography, and deposition. Further, in the preferred embodiment, the second micro structures 420 may be made of polymethy methacrylate, (PMMA). However in another embodiment, the second micro structures 420 may be made of the material the same as the second diffusion layer 320 or other different material.

As FIG. 3a shows, the first micro structure 410 has a first width $P_1$ and the second micro structure 420 has a second width $P_2$. The ratio of the first width $P_1$ to the second width $P_2$ is between 1.1 and 1.8. In other words, the first width $P_1$ is 1.1 to 1.8 times wider than the second width $P_2$. In the preferred embodiment, the first width $P_1$ is between 65 μm and 75 μm and the second width $P_2$ is between 48 μm and 52 μm. With the above-mentioned ratios, the light diffusion module of the present invention may obtain an improved light diffusion effect and thus output more evenly diffused light.

Figure 3B:
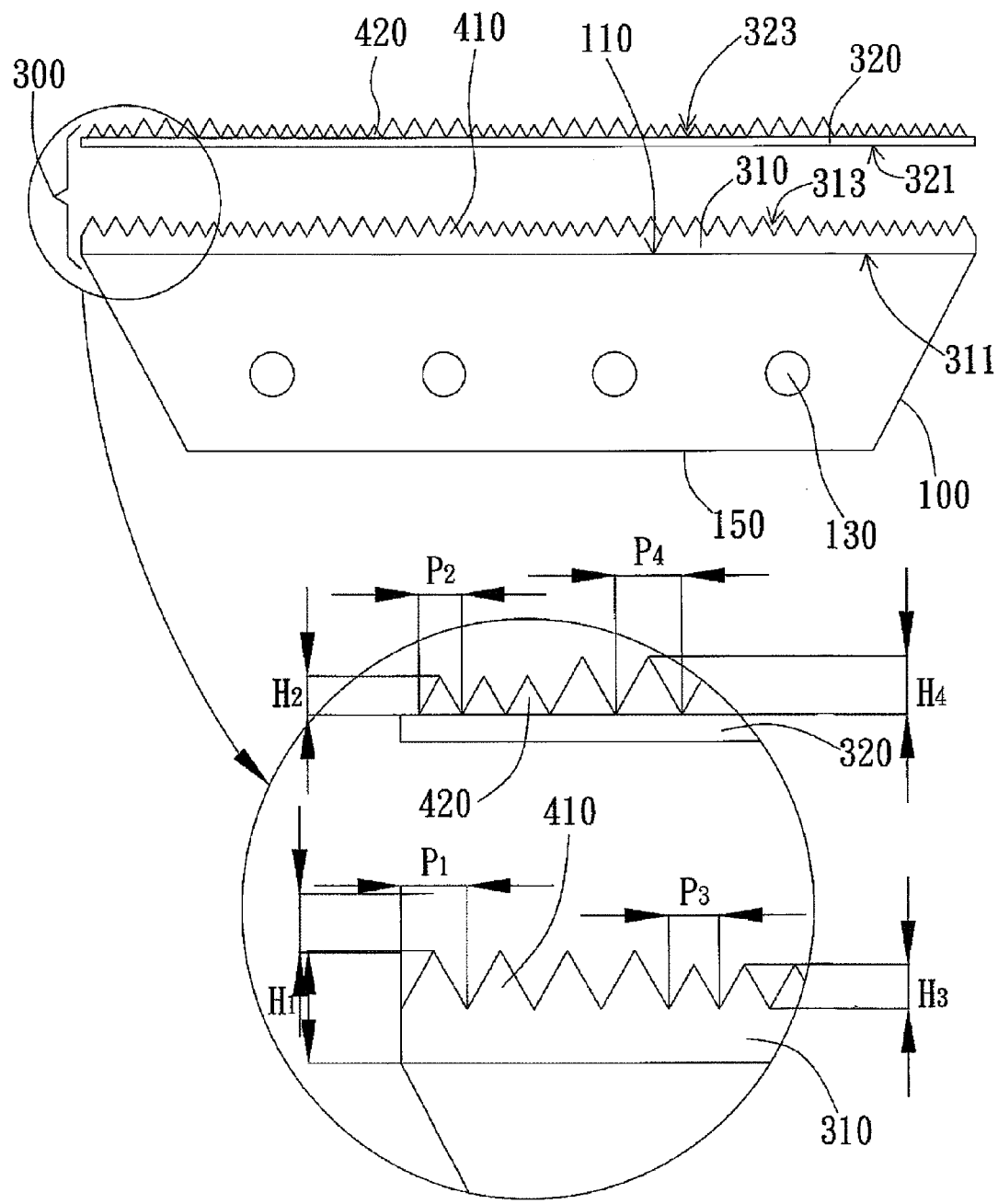
FIG. 3b is a sectional view, similar to the view of FIG. 3a, of an alternative embodiment.

In the preferred embodiment, each of the first micro structure 410 has an equivalent first width $P_1$. However, as shown in FIG. 3b, in another embodiment, the width of each first micro structure 410 is unnecessarily the same as that of the other first micro structure 410. That is, not all the first microstructures 410 have the same first width $P_1$. Certain first micro structures 410 have a third width $P_3$ different from the first width $P_1$. Still, the ratio of the third width $P_3$ to the second width $P_2$ is between 1.1 and 1.8.

Similarly, in the embodiment shown in FIG. 3b, the width of each second micro structure 420 is unnecessarily the same as that of the other second micro structures 420. That is, not all the second micro structures 420 have the same second width $P_2$. Certain second micro structures 420 have a fourth width $P_4$ different from the second width $P_2$. Still, the ratio of the first width $P_1$ to the fourth width $P_4$ is between 1.1 and 1.8.

As the preferred embodiment shown in FIG. 3a, each of the first micro structure 410 has a first height $H_1$, and each of the second structure 420 has a second height $H_2$. The ratio of the first height $H_1$ to the second height $H_2$ is between 0.8 and 1.5. In other words, the first height $H_1$ is between the ranges of 0.8 to 1.5 times of the second height $H_2$. Further, in another preferred embodiment, the first height $H_1$ is between 22 μm and 26 μm and the second height $H_2$ is between 23 μm and 27 μm.

In the preferred embodiment, each of the first micro structure 410 has an equivalent first height $H_1$. However, as shown in FIG. 3b, in another embodiment, the height of each first micro structure 410 is unnecessarily the same as that of the other first micro structures 410. That is, not all the first micro structures 410 have the first height $H_1$. Certain first micro structures 410 have a third height $H_3$ different from the first height $H_1$. Still, the ratio of the third height $H_3$ to the second height $H_2$ is between 0.8 and 1.5.

Similarly, in another embodiment shown in FIG. 3b, the height of each second micro structure 420 is unnecessarily the same as that of the other second micro structures 420. That is, not all the second micro structures 420 have the second height $H_2$. Certain second micro structures 420 have a fourth height $H_4$ different from the second height $H_2$. Still, the ratio of the first height $H_1$ to the fourth height $H_4$ is between 0.8 and 1.5.

As the embodiment shown in FIG. 3a, the light enters the first diffusion layer 310 from the bottom light entrance surface 311 of the first diffusion layer 310 after emitted from the light exit surface 110 of the light source module 100. As soon as the light is processed by the first micro structure 410, it is emitted from the top light exit surface 313, and it enters the second diffusion layer 320 and becomes an evenly diffused light source after processed by the second micro structure 420. In addition, due to the enhancing effect of the first micro structure 410 and the second micro structure 420, it may not cause too much luminance loss while the light passes through the first diffusion layer 310 and the second diffusion layer 320.

Figure 4:
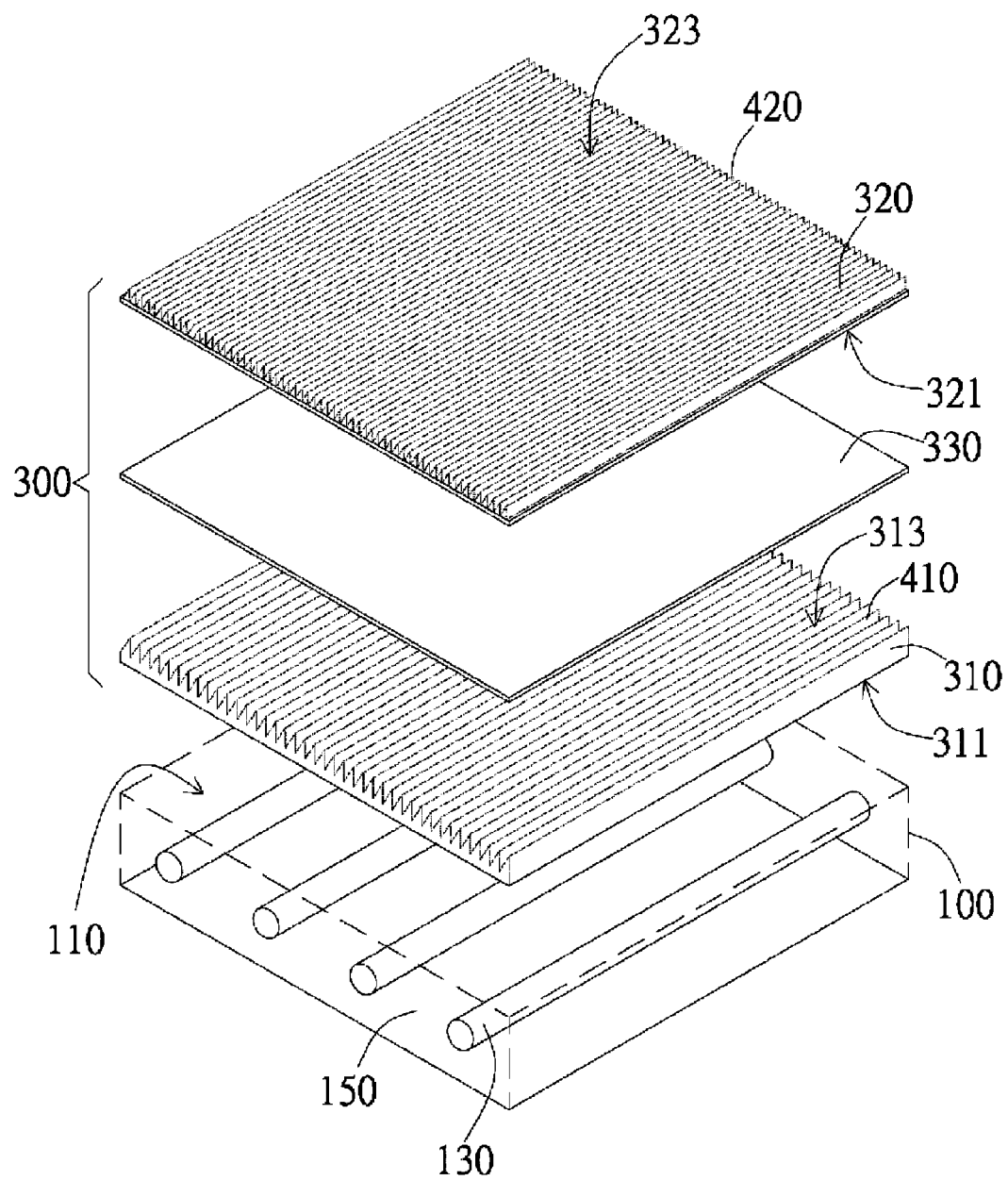
FIG. 4 is an explosive view of another embodiment of the present invention.
Figure 5:
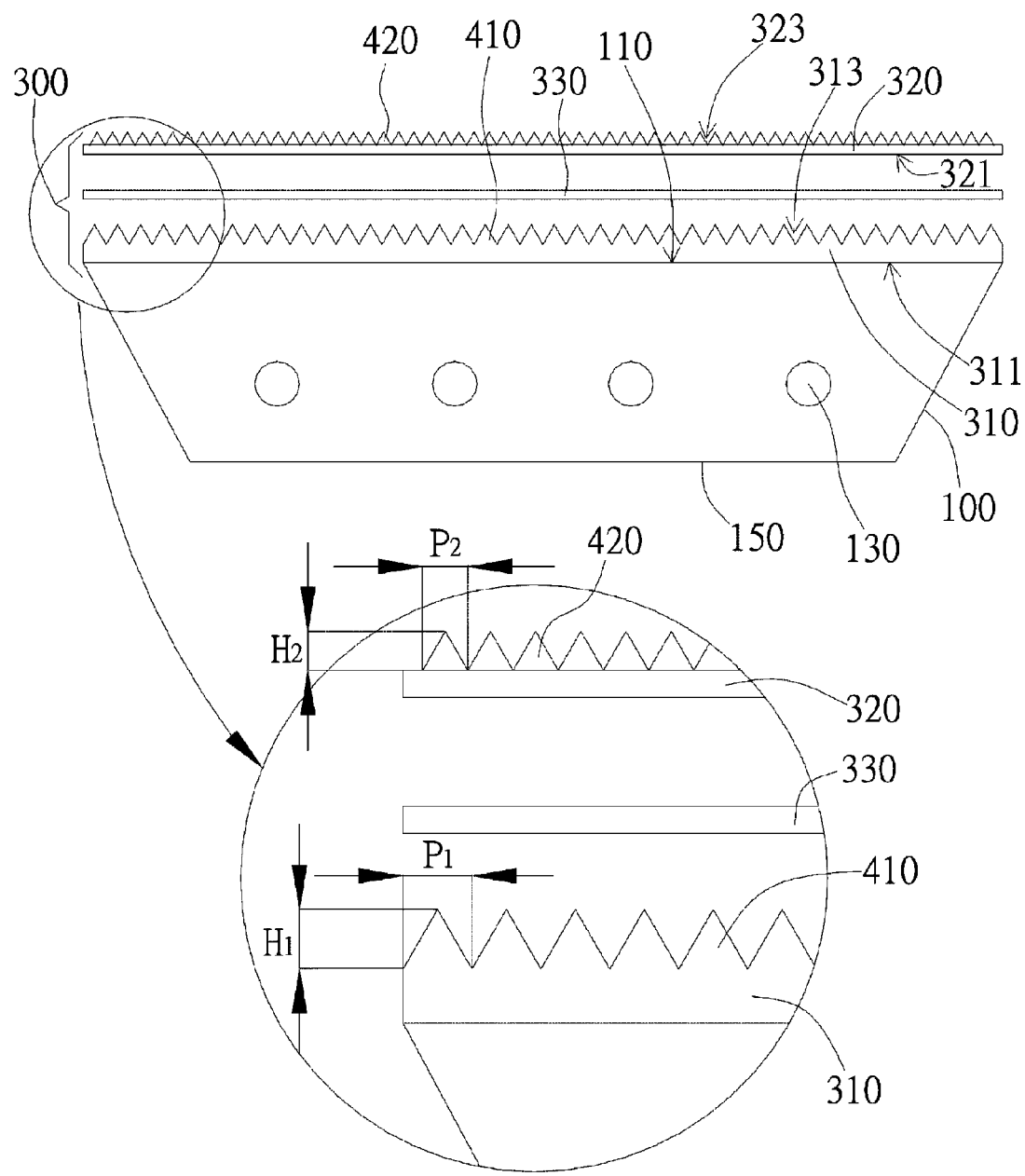
FIG. 5 is a sectional view of the embodiment shown in FIG. 4.

FIG. 4 and FIG. 5 shows another embodiment of the present invention. In the embodiment, the light diffusion module 300 further includes a third diffusion layer 330. The third diffusion layer 330 is disposed between the first diffusion layer 310 and the second diffusion layer 320. That is, before entering the second diffusion layer 320, the light will enter the third diffusion layer 330 after emitting from the top light exit surface 313 of the first diffusion layer 310. After processed by the third diffusion layer 330, the light enters the second diffusion layer 320 from the third diffusion layer 330.

The haze value of the third diffusion layer is preferred over 80%. In the preferred embodiment, the third diffusion layer 330 has a plurality of micro molecule structures, making the third diffusion layer to have enough haze value to produce the diffusion effect. In the preferred embodiment, the third diffusion layer 330 is an optical diffusion film, made of polyester, (PET). However, in another embodiment, the third diffusion layer 330 may be made of other organic material, such as polycarbonate, (PC) etc.

Figure 6:
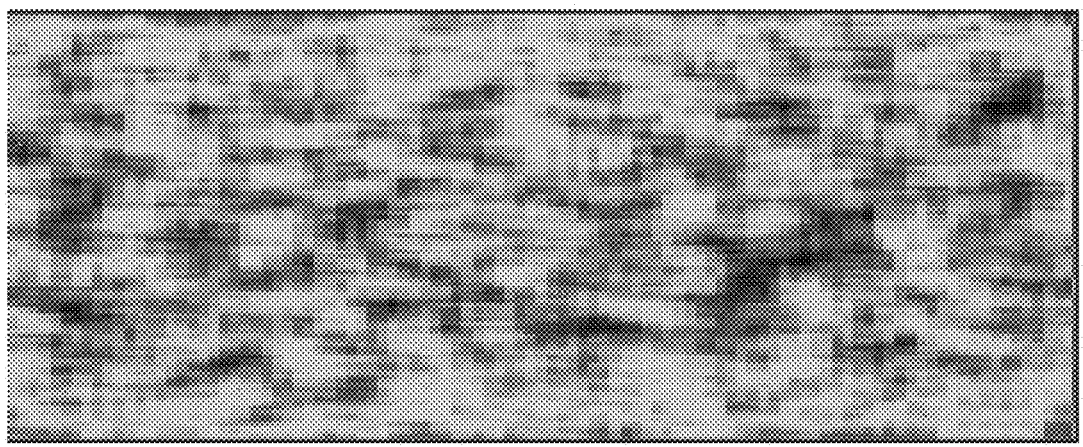
FIG. 6 is a simulation diagram of the light distribution while applying the structure of the embodiment shown in FIG. 4.

FIG. 6 shows a simulation diagram of the light distribution from applying the structure of the embodiment shown in FIG. 4 and FIG. 5, wherein the dark area is the area with weaker light while the undertone area is the area with stronger luminance. As FIG. 6 shows, the light at the undertone area has been uniformly diffused, which also mixes with the light at the dark area without concentration in luminance. From the above, it is known that the light emitted from the lamp 130 in the light source module 100 has been uniformly diffused, in other words, the light diffusion module 300 has the characteristic with a more even light distribution compared to the prior art.

In addition to raising the evenness of the light source will not jeopardize the luminance of the output light. Taking the embodiment shown in FIG. 4 and FIG. 5 as an example, when the embodiment is applied in a 32-inch liquid crystal display panel, it will need no more than twelve lamps 130 disposed in the light source module 100 to create the luminance of 400 $cd/m^2$ (NIT) or even the luminance of 500 NIT. In the embodiment of the 37-inch panel, it will need no more than fourteen lamps 130 to reach the same NIT mentioned above. As for the panel sized from 45 inches to 47 inches, no more than twenty lamps 130 are needed to create the same luminance mentioned above.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A light diffusion module for use with a back light module, comprising:
    a first diffusion layer including a bottom light entrance surface and a top light exit surface, wherein said top light exit surface has a plurality of first micro structures juxtapositioned to each other, at least a part of said first micro structures have a first height; and
    a second diffusion layer disposed above said first diffusion layer, including a bottom surface and a top surface, wherein said bottom surface is disposed opposite to said top light exit surface of said first diffusion layer, said top surface has a plurality of second micro structures juxtapositioned to each other, at least a part of said second micro structure have a second height;
    wherein a ratio of said first height to said second height is between 0.8 and 1.5.

2. The light diffusion module of claim 1, wherein said first height is between 22 μm and 26 μm.

3. The light diffusion module of claim 1, wherein said second height is between 23 μm and 27 μm.

4. The light diffusion module of claim 1, wherein at least a part of said first micro structures have a third height different from said first height, the ratio of said third height to said second height is between 0.8 and 1.5.

5. The light diffusion module of claim 1, wherein at least a part of said second micro structures have a fourth height different from said second height, the ratio of said first height to said fourth height is between 0.8 and 1.5.

6. The light diffusion module of claim 1 further comprising a third diffusion layer, disposed between said first diffusion layer and said second diffusion layer, wherein a haze value of said third diffusion layer is over 80%.

7. The light diffusion module of claim 6, wherein said third diffusion layer is made of Polyester, (PET).

8. The light diffusion module of claim 1, wherein said first micro structure and said second micro structure are disposed along the same direction.

9. The light diffusion module of claim 1, wherein said first diffusion layer includes a diffuser plate disposed on said light diffusion module.

10. The light diffusion module of claim 1, wherein the material of said first diffusion layer is made of Cyclo Olefin Polymer, (COP).

11. The light diffusion module of claim 1, wherein said first micro structure is attached to said first diffusion layer.

12. The light diffusion module of claim 1, wherein said first micro structure is formed on said first diffusion layer by an optical membrane manufacturing process.

13. The light diffusion module of claim 12, wherein said optical film manufacturing process includes an etching process.

14. The light diffusion module of claim 12, wherein said optical film manufacturing process includes a lithography process.

15. The light diffusion module of claim 1, wherein said first micro structure is made of Polymethyl methacrylate, (PMMA).

16. The light diffusion module of claim 1, wherein said second diffusion layer includes an optical thin film.

17. The light diffusion module of claim 16, wherein the material of said optical film is selected from a group of Polyester, PET, Polycarbonate, PC and any combination therefrom.

18. The light diffusion module of claim 1, wherein said second micro structure is attached to said second diffusion layer.

19. The light diffusion module of claim 1, wherein said second micro structure is formed on said second diffusion layer by an optical film manufacturing process.

20. The light diffusion module of claim 19, wherein said optical film manufacturing process includes an etching process.

21. The light diffusion module of claim 19, wherein said optical film manufacturing process includes a lithography process.

22. The light diffusion module of claim 1, wherein said second micro structure is made of Polymethyl methacrylate, (PMMA).

23. The light diffusion module of claim 1, wherein said first micro structure has a triangular cross section.

24. The light diffusion module of claim 1, wherein said second micro structure has a triangular cross section.

25. The light diffusion module of claim 1, wherein a ratio of said first width to said second width is between 1.1 and 1.8.

26. The light diffusion module of claim 1, wherein said first width is between 65 μm and 75 μm.

27. The light diffusion module of claim 1, wherein said second width is between 48 μm and 52 μm.

28. The light diffusion module of claim 1, wherein at least a part of said first micro structures have a third width different from said first width, the ratio of said third width to said second width is between 1.1 and 1.8.

29. The light diffusion module of claim 1, wherein at least a part of said second micro structures have a fourth width different from said second width, the ratio of said first width to said fourth width is between 1.1 and 1.8.

30. A back light module, comprising:
   a light source module, having a light exit surface; and
   a light diffusion module of claim 1 disposed corresponding to said light exit surface.

31. A liquid crystal display device using the light diffusion module of claim 1, wherein said liquid crystal display device is selected from a group of liquid crystal TV, liquid crystal monitor, liquid crystal display panel of mobile phone and liquid crystal display panel of digital camera.

32. A manufacturing method of a light diffusion module for use with a back light module, comprising:
   disposing a first diffusion layer on the back light module, wherein the first diffusion layer includes a bottom light entrance surface and a top light exit surface, the first diffusion layer has a plurality of first micro structures juxtapositioned to each other, and at least a part of the first micro structures have a first width and a first height;
   disposing a second diffusion layer on the first diffusion layer, wherein the second diffusion layer includes a bottom surface and a top surface, the bottom surface is disposed in opposition to the top light exit surface of the first diffusion layer, the top surface has a plurality of second micro structures juxtapositioned to each other, and at least a part of the second micro structure have a second width and a second height; and
   adjusting a ratio of the first height to the second height between 0.8 and 1.5.

33. The manufacturing method of claim 32, further comprising: adjusting a ratio of the first width to the second width between 1.1 and 1.8.

34. The manufacturing method of claim 33, further comprising: adjusting at least a part of the first micro structures from the first width to a third width, wherein the ratio of the third width to the second width is between 1.1 and 1.8.

35. The manufacturing method of claim 33, further comprising: adjusting at least a part of the second micro structures from the second width to a fourth width, wherein the ratio of the first width to the fourth width is between 1.1 and 1.8.

36. The manufacturing method of claim 32, further comprising: adjusting a part of the first micro structures from the first height to a third height, wherein the ratio of the third height to the second height is between 0.8 and 1.5.

37. The manufacturing method of claim 32, further comprising: adjusting a part of the second micro structures from the second height to a fourth height, wherein the ratio of the first height to the fourth height is between 0.8 and 1.5.

* * * * *